Aug. 7, 1962 G. L. MORGAN 3,048,408

TURNTABLES OF RECORD PLAYERS

Filed Aug. 28, 1959

INVENTOR,
GEORGE LEONARD MORGAN

BY Oberlin, Maky & Donnelly

ATTORNEYS

United States Patent Office 3,048,408
Patented Aug. 7, 1962

3,048,408

TURNTABLES OF RECORD PLAYERS

George Leonard Morgan, 3 Ballater St., Essendon, near Melbourne, Victoria, Australia Filed Aug. 28, 1959, Ser. No. 836,746
Claims priority, application Australia Sept. 1, 1958
8 Claims. (Cl. 274—39)

This invention relates to the turntables of record players of the play-back type, and has for its principal object the elimination therefrom of noise, generally known as rumble and hum, and in fact, all other forms of extraneous noise likely to originate in the turntable as distinct from that emanating from the record being played back.

A further object of the invention is to provide means for mounting the pick-up of a record player in such manner that vibration in the cabinet or frame, and/or motor and drive, will not be communicated to the pick-up. Yet another object is to provide an adjustable mount for the pick-up.

According to this invention, the turntable, its spindle and spindle bearing and the pick-up are mounted as one unit, in a floating condition with respect to the remainder of the record player namely, the frame, motor, wheels, belts or other working or stationary parts.

The turntable is mounted on its spindle which runs in bearings carried by a three-armed or other suitable spider or mounting, with vibration-arresting grommets or sponge rubber pads or the like suspension media set at the extremities of the arms or mounting. The pick-up is supported by a member which is rigidly attached to or formed integrally with the turntable mounting so that both the pick-up and the turntable are supported by vibration-arresting means. The motor and its controls may be mounted resiliently on the frame of the apparatus, independently of the mounting of the turntable and pick-up.

Preferably, the turntable mounting is in the form of a three-armed spider having at the outer end of one arm an integral pick-up mounting platform which extends outwardly from the turntable, and on this platform the pick-up is mounted. This pick-up may be mounted in a sleeve member fitted slidably in a boss having means for securing the sleeve in set position and the boss is at one end of a slotted arm connected adjustably to the pick-up mounting platform.

Thus, the turntable spindle, the bearing therefor and the bearings support, as well as the pick-up are mounted as one unit isolated by being fully floating from the remainder of the record player, and the pick-up may be adjusted in position relative to the turntable.

For a full understanding of the invention attention is directed to the accompanying drawings, wherein.

Figure 1:
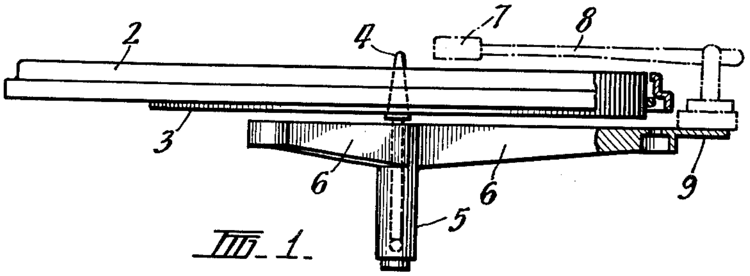
FIG. 1 is a side elevation partly in section of the preferred arrangement.
Figure 2:
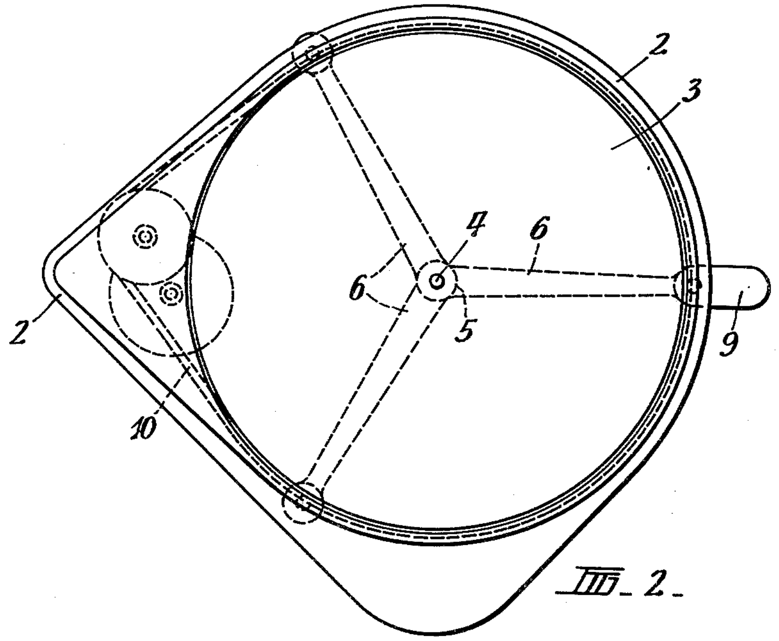
FIG. 2 is a plan view.

In the drawings, the reference numeral 3 indicates the turntable, mounted on a spindle 4 which is supported in a bearing block 5, forming part of a spider of which the radiating arms 6 also form a part, said spider being located beneath the turntable and being adapted to be fitted to a suitable support as the top 2 of a frame or cabinet. At the end of each arm 6 is a socket 1 for the accommodation of a sponge rubber mounting pad or other suitable resilient or anti-vibration member.

It is normal practice to mount the pick-up on the top of the frame or cabinet of the record player, and therefore it has been subject to vibration and the collection of extraneous noises from the motor and associated parts.

According to this invention the pick-up 7 is mounted on its arm 8 which in turn is mounted, as shown in FIG. 1, on a platform 9 secured to or integral with a selected arm 6 of the spider.

It will be seen that the turntable 3 is connected to the spider at one point only, namely the spindle 4, and that the pick-up 7 and its arm and mounting are carried by the platform 9, and thus the whole arrangement is in effect a single unit fully isolated from the frame, motor and other parts of the record player or that is to say, the energising or driving units.

It is preferred that the turntable 3 be belt driven, and in the drawings the belt is indicated by the reference numeral 10, but the invention is not in any way restricted to belt driven turntables.

Figure 3:
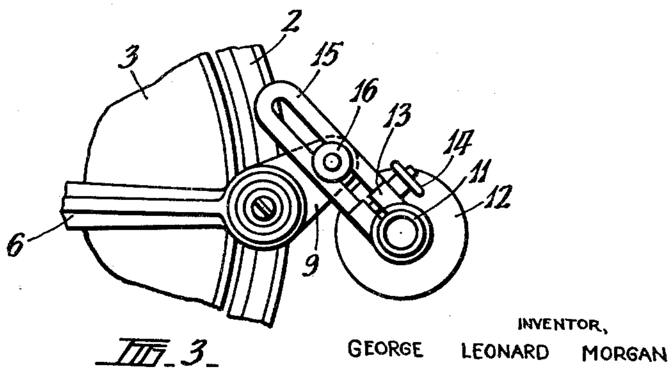
FIG. 3 is an underside view showing the manner of mounting the pick-up on the mounting platform.

In order to provide for adjustment of the pick-up relative to the turntable I provide the devices illustrated in FIG. 3. These consist of a sleeve member 11 having an external flange 12 at its upper end (when considered in its normal position, not the inverted position as shown in this figure of the drawing) and mounted in a split boss 13. A clamping screw 14 in that boss enables the sleeve to be clamped tightly in any desired adjusted position.

The boss 13 is at one end of a slotted arm 15 which is connected to the platform 9 by means of a screw and clamping nut indicated by the reference 16. By means of this arrangement the sleeve member 11 may be moved linearly and/or angularly relative to the platform 9 and then clamped tightly in any desired adjusted position.

That is to say, the pick-up mounting may be adjusted vertically, angularly and/or laterally relative to the turntable mounting.

In the constructions hitherto provided vibrations, due to the energising or working parts inseparable from a record player, tended to affect adversely the play-back of the recording on the turntable, because the turntable and the pick-up were not isolated from the remainder of the record player. If the turntable be isolated from the motor and other mechanism, but the pick-up be not isolated, there will still be extraneous noise in the apparatus.

These present invention results in noiseless and vibration-free running of the record player, providing a very decided improvement in the quality of any recording played back on the machine.

What I claim is:

1. A record player unit effectively isolated from a support except through a single connection, said unit comprising a mounting adapted to make said single connection to a support, a turntable for carrying a record rotatably journaled on said mounting, a pick-up also supported by said mounting adjacent the periphery of the turntable for operatively engaging such record, and energizing means to rotate the turntable entirely free of contact with said support.

2. A record player unit effectively isolated from a support except through a single connection, said unit comprising a mounting having anti-vibration means and adapted to make said single connection to a support, a turntable for carrying a record rotatably journaled on a spindle carried by said mounting, a pick-up also supported by said mounting adjacent the periphery of the turntable and in floating relation to such support for operatively engaging such record, energizing means to rotate the turntable, and a support for the energizing means spaced from and free of any contact with said mounting.

3. A record player comprising a support; a unitized construction carried solely by said support comprising a mounting having anti-vibration means to position the mounting in a floating condition relative to said support, a bearing in the mounting, a spindle freely rotatable in said bearing, a turntable attached to the spindle for carrying a record, a pick-up also supported by said mounting adjacent the periphery of the turntable for operatively engaging such record; and means also supported solely by said support to rotate said turntable, said means being entirely free of any direct and indirect contact with said mounting except solely through such rotation of the turntable.

4. A record player comprising a support; a unitized construction carried solely by said support comprising a spider having a plurality of arms, anti-vibration supports at least at one of the outer ends of said spider arms to position a mounting thereat in a floating condition relative to said support, a bearing at the center of said spider, a spindle freely rotatable in said bearing, a turntable attached to said spindle for carrying a record, a mounting platform at the outer end of said at least one of said spider arms, a supporting arm mounted for linear and angular adustment on the mounting platform, means for clamping the supporting arm in fixed position relative to the mounting platform, a boss at one end of the supporting arm, a sleeve slidable in said boss, means for clamping the sleeve in fixed position relative to the boss, and a pick-up carried by said sleeve for operatively engaging such record; and means to rotate the turntable also supported solely by said support free of any contact with said spider and reaching and contacting the turntable solely through said means to rotate the same.

5. The record player of claim 4 wherein said means for rotating the turntable is a belt drive.

6. A record player as claimed in claim 3 wherein the pick-up support is adjustable relative to the turntable mounting.

7. A record player as claimed in claim 6 wherein the pick-up support comprises a boss, a sleeve mounted for vertical sliding movement in said boss, and clamping means on said boss for clamping the sleeve in set position relative to said boss.

8. A record player as claimed in claim 6 wherein the pick-up support comprises a mounting platform integral with the turntable mounting, a slotted arm mounted for angular and linear movement relative to the mounting platform, and a sleeve fitted to said arm.

References Cited in the file of this patent

UNITED STATES PATENTS

| | | |
|---|---|---|
| 852,725 | Kramer | Dec. 19, 1905 |
| 2,927,795 | Drake | Mar. 8, 1960 |

FOREIGN PATENTS

| | | |
|---|---|---|
| 192,855 | Great Britain | Feb. 15, 1923 |
| 740,896 | Germany | Oct. 11, 1944 |
| 453,667 | Canada | Dec. 28, 1948 |
| 137,427 | Sweden | Sept. 23, 1952 |